United States Patent
Nakayama et al.

(10) Patent No.: US 9,332,207 B2
(45) Date of Patent: May 3, 2016

(54) VEHICULAR DISPLAY DEVICE

(71) Applicant: HONDA MOTOR CO., LTD., Tokyo (JP)

(72) Inventors: Masaru Nakayama, Wako (JP); Yoshimitsu Ishida, Wako (JP); Koji Aoki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 1 day.

(21) Appl. No.: 14/070,737

(22) Filed: Nov. 4, 2013

(65) Prior Publication Data

US 2014/0125876 A1 May 8, 2014

(30) Foreign Application Priority Data

Nov. 8, 2012 (JP) ................................ 2012-245925

(51) Int. Cl.
*H04N 5/64* (2006.01)
*B60K 37/02* (2006.01)

(52) U.S. Cl.
CPC . *H04N 5/64* (2013.01); *B60K 37/02* (2013.01)

(58) Field of Classification Search
None
See application file for complete search history.

(56) References Cited

U.S. PATENT DOCUMENTS

| | | | | |
|---|---|---|---|---|
| 6,622,083 B1 * | 9/2003 | Knockeart | ........... | G01C 21/362 701/420 |
| 8,331,998 B2 * | 12/2012 | Baratono | ................. | B60R 1/12 455/344 |
| 2003/0043029 A1 * | 3/2003 | Ichikawa | .................. | B60R 1/00 340/435 |
| 2004/0160124 A1 * | 8/2004 | Arai | .................... | B60R 11/0252 307/10.1 |
| 2004/0186632 A1 * | 9/2004 | Arai | ....................... | B60K 35/00 701/1 |
| 2005/0270146 A1 * | 12/2005 | Enya | ....................... | B60Q 5/00 340/438 |
| 2009/0210110 A1 * | 8/2009 | Dybalski | ................ | B60K 35/00 701/31.4 |
| 2009/0261219 A1 * | 10/2009 | Chen | .................... | B60R 11/0211 248/206.2 |
| 2010/0277862 A1 * | 11/2010 | Kim | ........................ | B60R 11/02 361/679.41 |
| 2011/0122074 A1 * | 5/2011 | Chen | ................... | G01C 21/3688 345/173 |

FOREIGN PATENT DOCUMENTS

| | | |
|---|---|---|
| JP | 2000-165497 | 6/2000 |
| JP | 2000-253122 | 9/2000 |
| JP | 2001-043408 | 2/2001 |
| JP | 2005-343431 | 12/2005 |
| JP | 2009-083737 | 4/2009 |
| JP | 2011-037310 | 2/2011 |
| JP | 2011-111123 | 6/2011 |
| JP | 2011-112640 | 6/2011 |
| JP | 2014-65379 | 4/2014 |

OTHER PUBLICATIONS

Japanese Office Action with Partial English translation dated Nov. 11, 2014, 8 pages.
Japanese Office Action, date of mailing, May 27, 2014. Partial English Translation included.

* cited by examiner

*Primary Examiner* — Hilina K Demeter
(74) *Attorney, Agent, or Firm* — Rankin, Hill & Clark LLP

(57) ABSTRACT

A vehicular display device includes an information display portion disposed on a housing provided forwardly of a driver's seat. The information display portion has a display screen disposed in opposed relationship to the driver's seat. The display device further includes a holder unit disposed rearwardly of the housing in opposed relationship with the information display portion, and a mobile terminal detachably retained between the holder unit and the housing.

4 Claims, 14 Drawing Sheets

VEHICULAR DISPLAY DEVICE

FIELD OF THE INVENTION

The present invention relates to a vehicular display device including an information display portion disposed forwardly of a driver's seat, the information display portion having a display screen for displaying information such as a vehicular velocity or navigation map.

BACKGROUND OF THE INVENTION

Vehicles include information display devices disposed in front of drivers for displaying information necessary when they drive the vehicles. A well-known information display device includes a liquid crystal projector for projecting information on a display screen located in front of a driver, as disclosed in JP-A-2011-111123.

There may be an occasion when it is necessary to bring a mobile terminal into a vehicle passenger compartment to acquire information from the mobile terminal. To accomplish this, the mobile terminal may be detachably disposed on an instrument panel (a housing), such that a driver can visually identify (or view) information displayed on the mobile terminal, as in the case of information displayed on the display screen of the information display device.

However, it may be difficult to view information displayed on the mobile terminal if the mobile terminal is disposed relatively remotely from the information display device.

SUMMARY OF THE INVENTION

It is an object of the present invention to provide a vehicular display device including a housing and a mobile terminal disposed at the housing such that a driver can visually identify (or view) information displayed on the mobile terminal in a comfortable position.

According to one aspect of the present invention, there is provided a vehicular display device having an information display portion disposed on a housing provided forwardly of a driver's seat of a vehicle, the information display portion having a display screen located in opposed relationship with the driver's seat, the device comprising: a holder unit disposed rearwardly of the housing in opposed relationship with the information display portion; and a mobile terminal detachably retained between the holder unit and the housing.

In short, the mobile terminal is retained between the housing and the holder unit disposed rearwardly of the housing in opposed relationship to the information display portion, such that the display screen of the information display portion is out of a driver's sight in alignment with a display screen of the mobile terminal, so as to allow the driver to view information displayed on the mobile terminal in a comfortable position, as in the case of information displayed on the display screen of the information display portion.

Preferably, the holder unit includes a warning display portion disposed on a front surface thereof located in opposed relationship with the driver's seat for indicating statuses of different parts of the vehicle.

Since the warning display portion is disposed on the front surface of the holder unit in opposed relationship to the driver's seat, the warning display portion is located closely to the display screen of the mobile terminal. As a result, assuming the comfortable position, the driver can view the information displayed on the mobile terminal as well as information displayed on the warning display portion.

Preferably, the holder unit further includes a holder body disposed separately from the warning display portion for detachably retaining the mobile terminal.

That is, the holder body retaining the mobile terminal is disposed separately from the warning display portion. The separate disposition or arrangements of the holder body and the warning display portion makes it possible to individually determine locations for mounting of the holder body and the warning display portion. As a result, the freedom to design the display device can be enhanced.

Preferably, the holder body of the holder unit is disposed between the warning display portion and the housing.

More specifically, the holder body is disposed between the warning display portion and the housing such that the warning display portion is located closer to the driver's seat than the holder body so as to allow the driver to view the information displayed on the warning display portion.

Preferably, the holder body is supported such that the holder body pivots in a front-and-rear direction of the vehicle between a detachable position located on a side of the driver's seat for allowing the mobile terminal to be attached to and detached from the holder body and a displaying position located on a side of the housing for displaying information on the mobile terminal.

When in the detachable position located on the side of the driver's seat, the holder body allows the mobile terminal to be easily attached to and detached from the holder body. When the holder body is in the displaying position, the driver can view the information displayed on the mobile terminal in the comfortable position.

Preferably, the holder body is a frame formed to allow the mobile terminal to be inserted into the frame, and wherein the mobile terminal includes a display screen for displaying information thereon, and a non-displaying surface surrounding the display screen, the non-displaying surface is disposed along the frame with the mobile terminal inserted into the frame.

That is, the mobile terminal is inserted into the frame such that the non-displaying surface of the mobile terminal is disposed along the holder body (i.e., the frame) without the display screen of the mobile terminal being covered by the holder body. As a result, it becomes possible for the driver to more successfully view the information displayed on the mobile terminal.

Preferably, the holder body includes a recess formed on a bottom of the holder body for retaining a charging connector connectable to the mobile terminal, and an insertion hole communicating with the recess for allowing insertion of a harness of the connector through the insertion hole.

In other words, the charging connector is retained in the recess formed on the holder body and the harness of the charging connector is inserted through the insertion hole communicating with the recess, such that the charging connector can be taken out of the recess. As a result, the charging connector can be handled so easily that the charging connector can be connected to the mobile terminal without requiring a lot of time and effort.

Preferably, the display device further comprising a non-contact charging unit incorporated in one of the holder unit and the housing for charging the mobile terminal without contacting the mobile terminal.

More specifically, just insertion of the mobile terminal to the attachment location charges the mobile terminal in a non-contact manner. As a result, it takes less time and effort to charge the mobile terminal to thereby enhance the usability.

Preferably, the holder unit further includes an elastic member disposed in an inner space of the holder body, the elastic member being interposed between the holder body and the mobile terminal for retaining the mobile terminal in the holder body.

The disposition of the elastic member in the inner space of the holder body adapts the inner space of the holder body to a thickness of the mobile terminal. That is, the elastic member fills the gap between a width of the inner space and the thickness of the mobile terminal to prevent a backlash between the holder body and the mobile terminal.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE PREFERRED EMBODIMENTS

Figure 1:
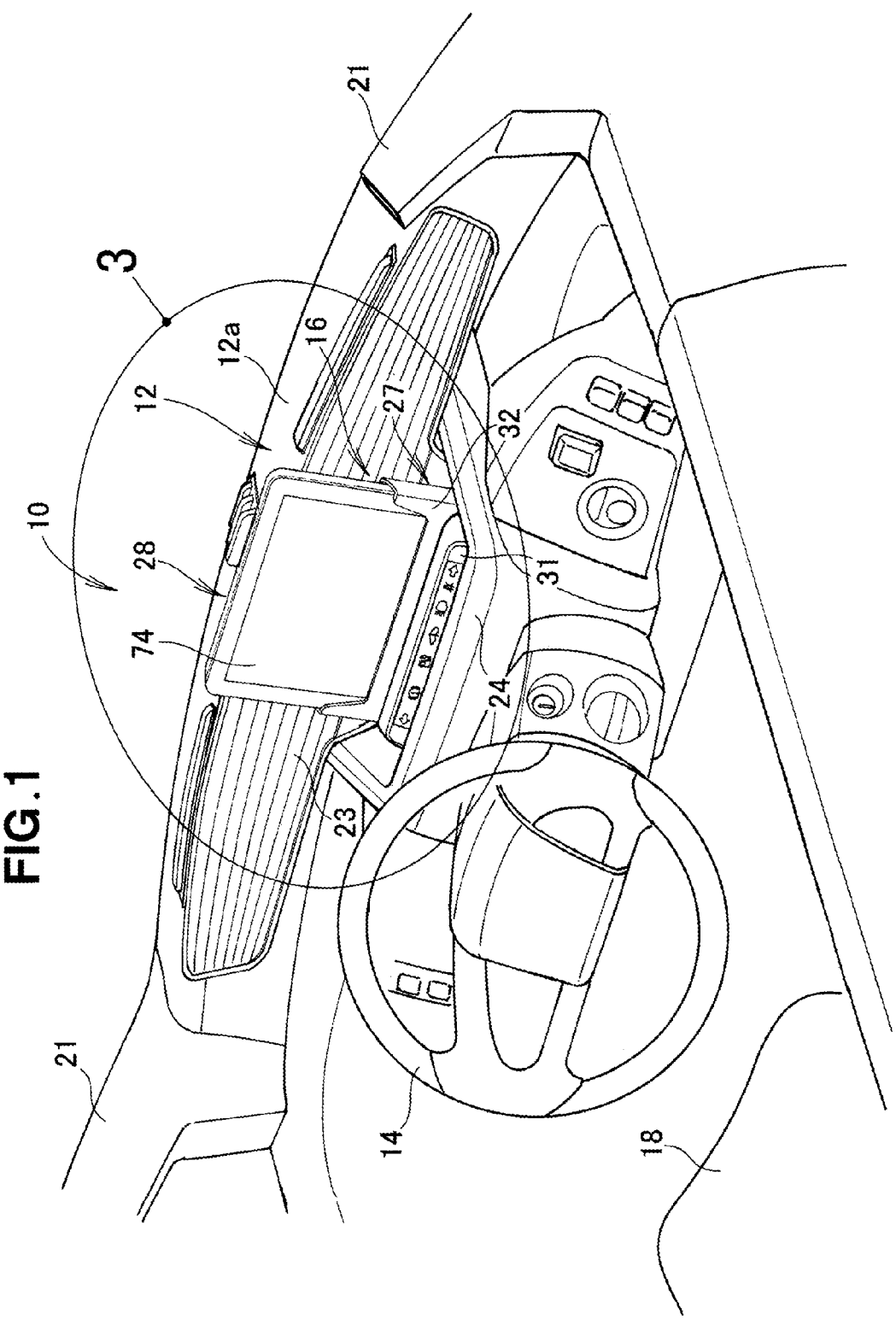
FIG. 1 is a perspective view of a vehicle including a display device in a first embodiment of the present invention.

The terms "forwardly" and "rearwardly" used herein mean a direction toward a front side of a vehicular body, and a direction toward a rear side of the vehicular body, respectively. It is noted that like reference numerals designate like parts throughout the drawings. A discussion will be made below as to a vehicular display device 16 in a first embodiment of the present invention.

As shown in FIG. 1, a vehicle 10 is an electric car including an instrument panel (a housing) 12 disposed at a front part of a vehicle body thereof, a steering wheel 14 disposed rearwardly of the housing 12, the display device 16 disposed forwardly of the steering wheel 14, and a driver's seat 18 disposed rearwardly of the steering wheel 14.

The housing 12 extends between and interconnects left and right front pillars 21, and is disposed forwardly of the driver's seat 18. The housing 12 includes a display wall 23 disposed at an upper part 12a thereof in opposed relationship with the driver's seat 18. The housing 12 also includes a holder receiving portion 24 formed below the display wall 23. The steering wheel 14 is disposed on a rear end portion of a steering shaft protruding rearwardly from a longitudinal center of the housing 12. That is, the steering wheel 14 is disposed rearwardly of the housing 12 facing the longitudinal center of the housing 12.

Figure 2:
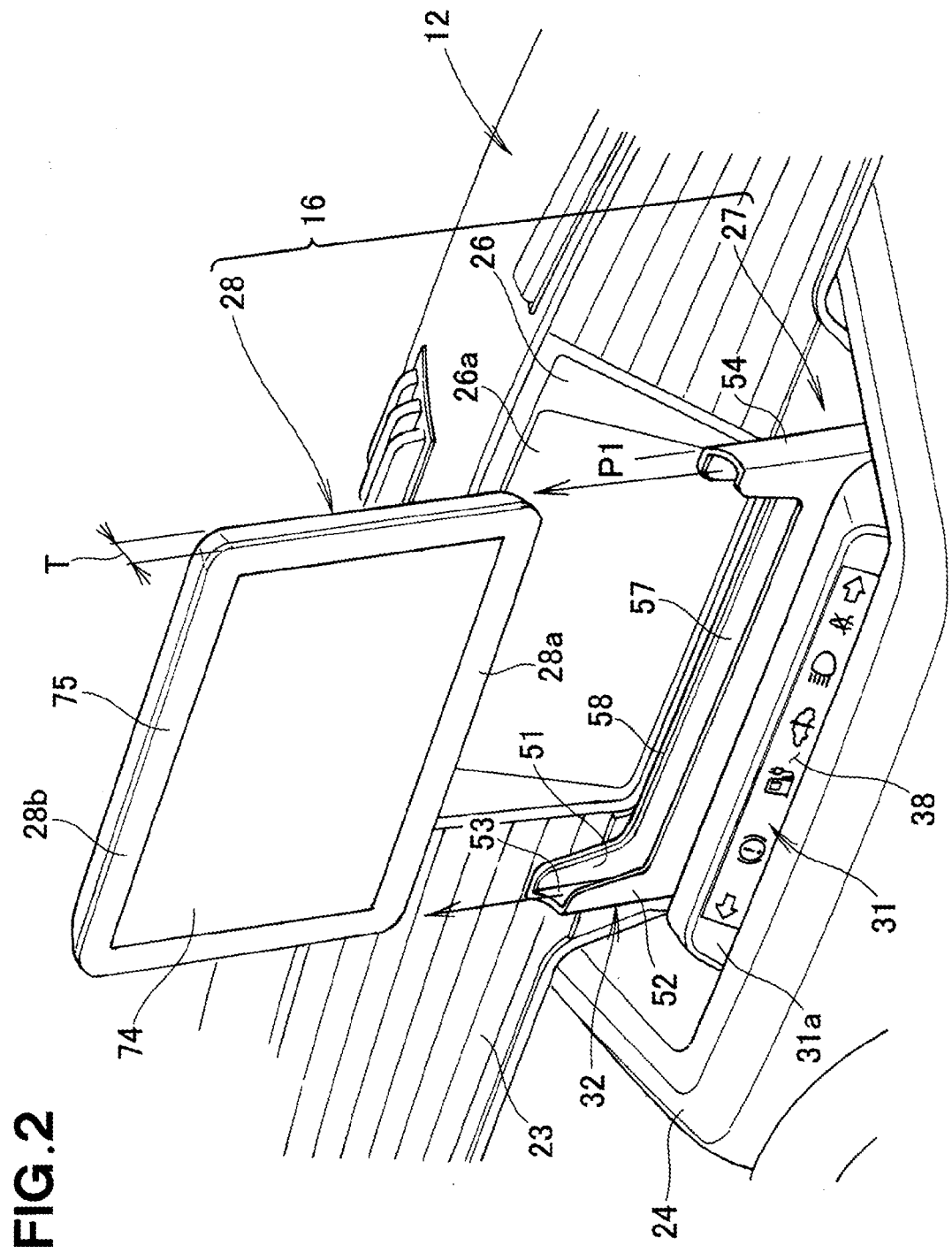
FIG. 2 is a perspective view showing that a mobile terminal is removed from a holder body shown in FIG. 1.

As shown in FIG. 2, the vehicular display device 16 includes an information display portion 26 provided longitudinally centrally of the display wall 23, a holder unit 27 disposed rearwardly of the display wall 23 in opposed relationship with the information display portion 26, and a mobile terminal 28 detachably retained between the holder unit 27 and the display wall 23.

The information display portion 26 includes a display screen 26a of a generally rectangular shape located in opposed relationship with the driver's seat 18, such that a driver seated on the driver's seat 18 can visually identify (or view) the display screen 26a, assuming a comfortable position. The information display portion 26 is configured to display information on a vehicular velocity, a navigation map or the like on the display screen 26a.

Figure 3:
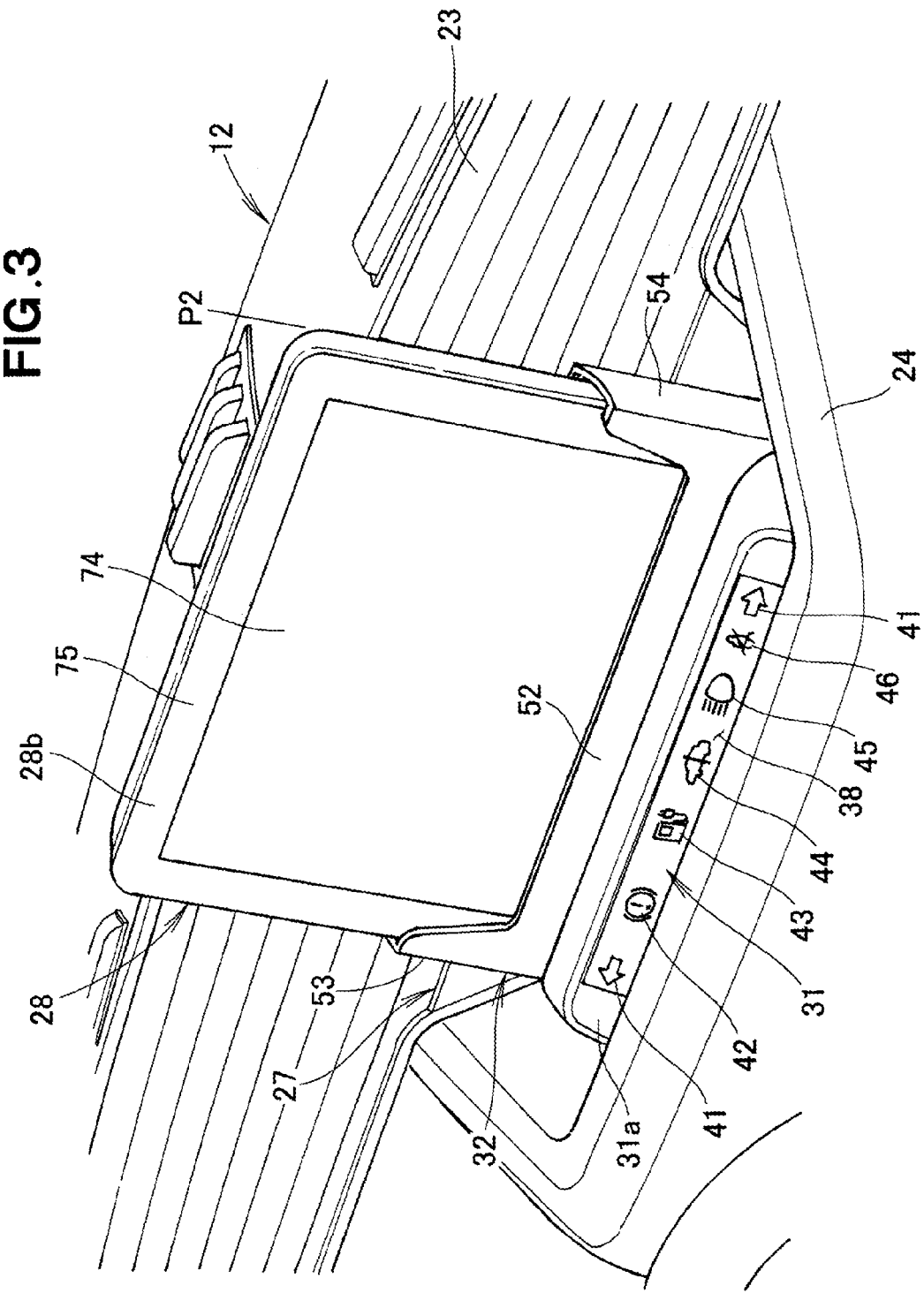
FIG. 3 is an enlarged view of a region 3 of FIG. 1.
Figure 4:
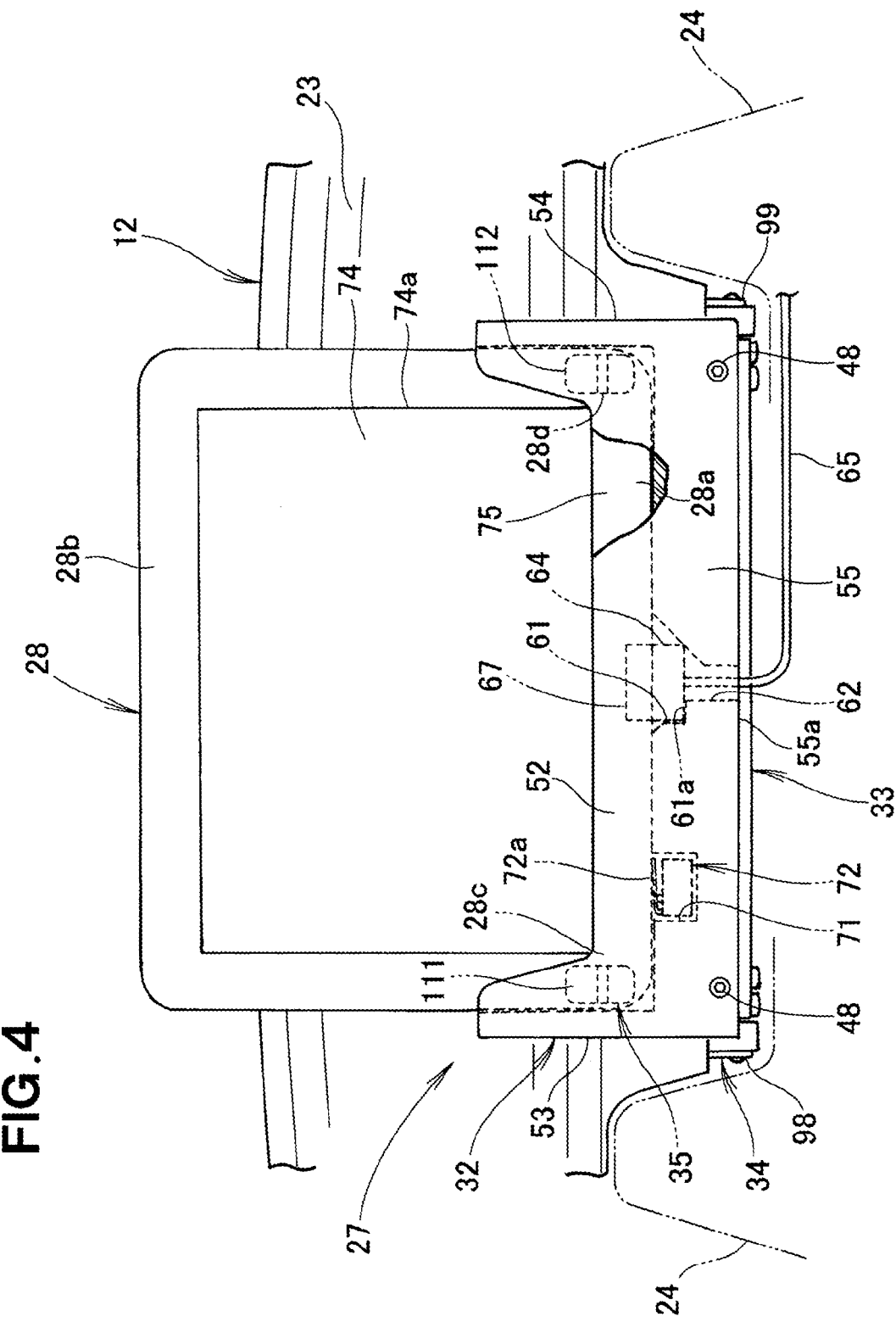
FIG. 4 is a front elevation view showing that the mobile terminal is inserted into the holder body in the first embodiment.

As shown in FIG. 3 and FIG. 4, the holder unit 27 includes a warning display portion 31 disposed on a front surface thereof located in opposed relationship with the driver's seat 18, a holder body 32 disposed between the warning display portion 31 and the display wall 23, supporting means 33 for pivotably supporting the holder body 32, locking means 34 for locking the supporting means 33 in a detachable position P1 (FIG. 2) or a displaying position P2, and retaining means 35 for retaining the mobile terminal 28 in the holder body 32.

The warning display portion 31 is secured to the holder receiving portion 24 and has a warning display screen 38 disposed on a front surface 31a thereof located in opposed relationship with the driver's seat 18 (FIG. 1). The warning display portion 31 has left and right directional indicators 41, a brake warning light 42, a battery indicator 43, an EV (electric vehicle) system warning light 44, a high beam indicator 45, and a seat belt warning light 46. The respective indictors and lights 41 to 46 on the warning display screen 38 can be turned on, when necessary, to indicate to the driver respective statuses of the corresponding different parts of the vehicle 10.

The warning display screen 38, which is provided by the front surface 31a located in opposed relationship with the driver's seat 18, is located proximate a terminal display screen (a display screen) 74 of the mobile terminal 28, such that information displayed on the terminal display screen 74 or the warning display screen 38 can be viewed by the driver as he assumes the comfortable position.

The holder body 32 is disposed between the warning display portion 31 and the display wall 23. That is, the warning display portion 31 is disposed closer to the driver's seat 18 (FIG. 1) than the holder body 32, such that information displayed on the warning display screen 38 can be viewed by the driver as he assumes the comfortable position.

Figure 5:
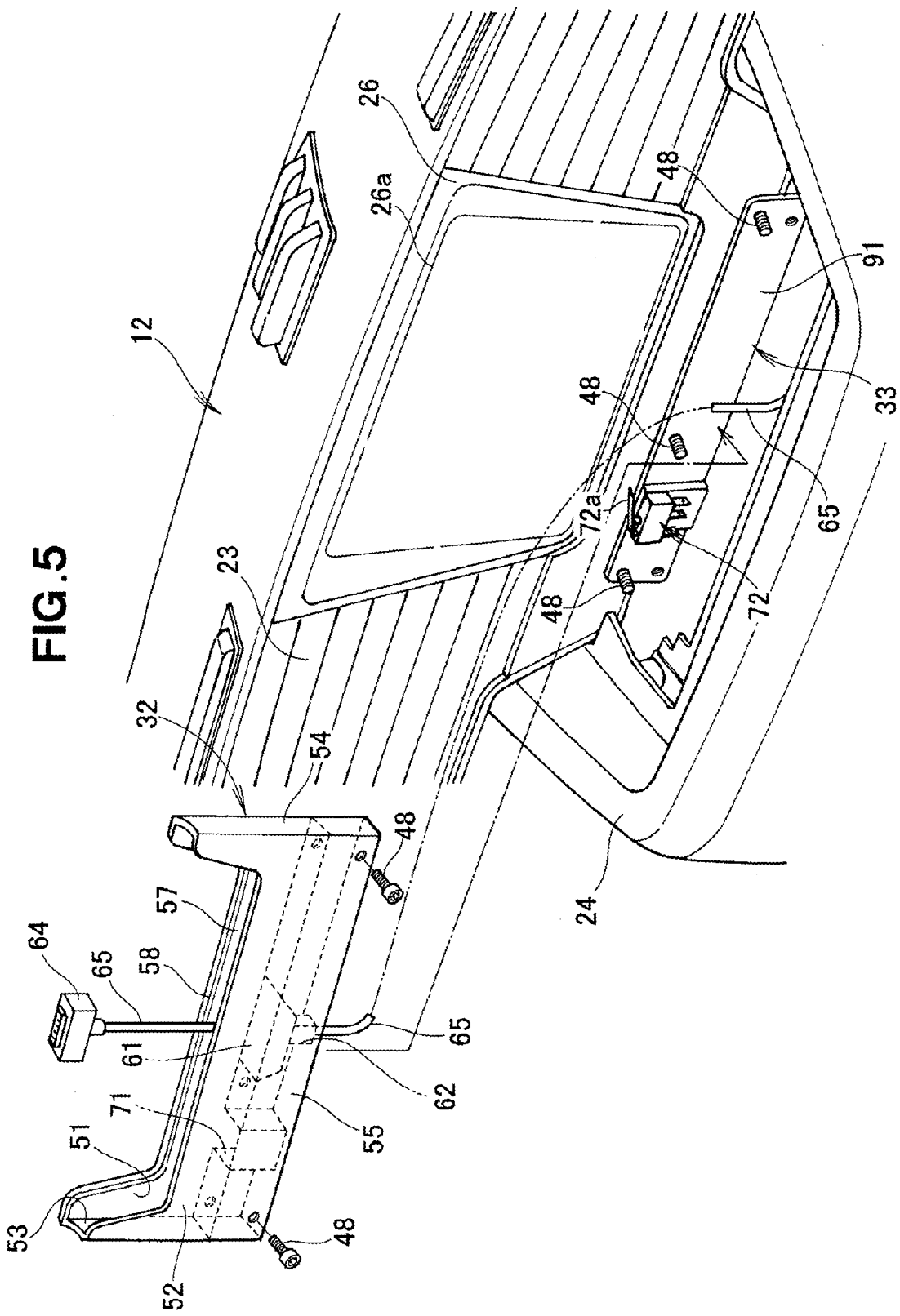
FIG. 5 is an exploded perspective view of a holder unit in the first embodiment as the holder unit is disassembled to provide the holder body.

As shown in FIG. 4 and FIG. 5, the holder body 32 is formed separately from the warning display portion 31 (FIG. 3) and has a lower portion 55 supported by the supporting means 33 through a plurality of bolts 48. Since the holder body 32 is disposed separately from the warning display portion 31, it becomes possible to individually determine locations for mounting of respective elements 31, 32, thereby enhancing the freedom to design the display device 16. It is noted that in FIG. 5 the warning display portion 31 (FIG. 3) is removed for easy understanding of a detection switch 72.

The holder body 32 includes a front wall 51, a rear wall 52, a left sidewall 53, and a right sidewall 54. The front and rear walls 51, 52, the left and right sidewalls 53, 54 and the lower portion 55 cooperate with one another to form a generally rectangular frame. The holder body 32 has an inner space 57 for receiving a lower portion 28a of the mobile terminal 28. The inner space 57 has a bottom closed by the lower portion 55 of the holder body 32. The lower portion 55 of the holder body 32 is supported by the supporting means 33 through the plurality of the bolts 48 with the front wall 51 contacting a pivotal bracket 91 of the supporting means 33. The holder body 32 has an opening 58 formed at a top thereof, and the opening 58 communicates with the inner space 57.

The holder body 32 is configured such that the mobile terminal 28 can be inserted from above the opening 58 into the inner space 57 of the holder body 32 and the mobile terminal 28 can be taken out of the inner space 57 through the opening 58. That is, the holder body 32 is a frame formed to detachably retain the lower portion 28a inserted through the opening 58 into the inner space 57. More specifically, when inserted into the inner space 57 of the holder body 32, the lower portion 28a of the mobile terminal 28 is retained by the lower portion 55, the left sidewall 53 and the right sidewall 54.

Formed in the lower portion 55 are a retaining recess (a recess) 61 and a harness insertion hole (an insertion hole) 62. The retaining recess 61 is formed to retain a charging connector 64 and is upwardly opened toward the inner space 57, such that the charging connector 64 retained in the retaining recess 61 can be connected to a connection portion 67 of the mobile terminal 28 with the lower portion 28a inserted into the inner space 57 of the holder body 32. Since the upwardly opened, retaining recess 61 communicates with the inner space 57, the charging connector 64 can be taken from the recess 61 through the inner space 57 out of the opening 58.

The harness insertion hole 62 interconnects a bottom 61a of the retaining recess 61 and a bottom 55a of the lower portion 55 such that a harness 65 of the charging connector 64 can be movably inserted through the harness insertion hole 62. When the charging connector 64 is removed from the holder body 32 with the harness 65 inserted through the harness insertion hole 62, the harness 65 can be moved vertically through the harness insertion hole 62 in order that the charging connector 64 removed from the holder body 32 (FIG. 5) can be connected to the connection portion 67 of the mobile terminal 28. The removal of the charging connector 64 from the holder body 32 facilitates the connection of the charging connector 64 to the connection portion 67 of the mobile terminal 28.

When the mobile terminal 28 is removed from the holder body 32, also, the charging connector 64 is pulled up out of the retaining recess 61 to come out of the holder body 32 together with the mobile terminal 28, after which the charging connector 64 can be easily disconnected from the connection portion 67. That is, the charging connector 64 can be easy to handle, such that the charging connector 64 can be easily connected to or disconnected from the connection portion 67 of the mobile terminal 28. Namely, it is possible to connect the charging connector 64 to the mobile terminal 28 without taking a lot of time and effort.

Figure 8:
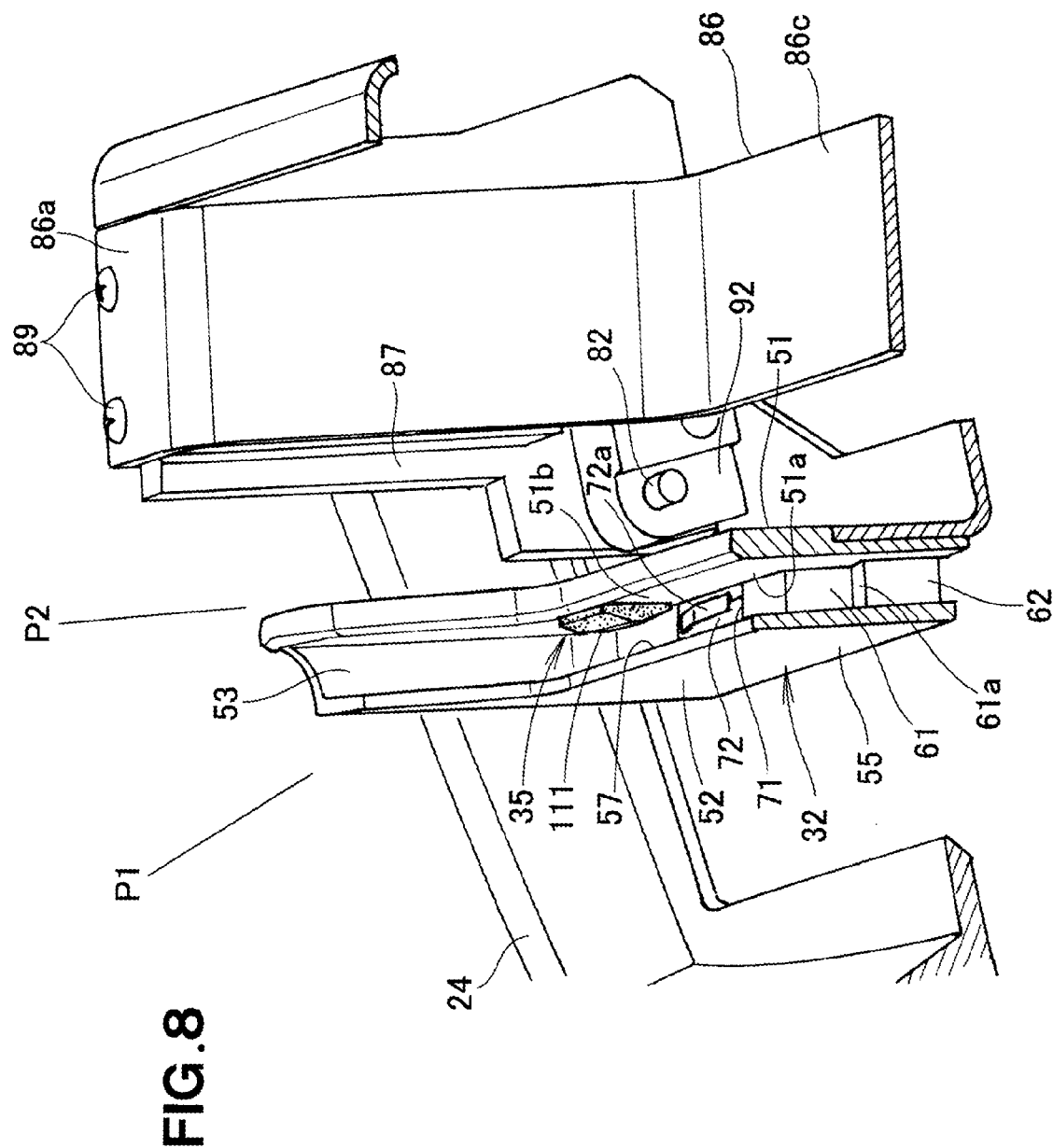
FIG. 8 is a cross-sectional view of the holder unit in the first embodiment.

The bottom portion 55 of the holder body 32 has a receiving space 71 formed therein for receiving the detection switch (a microswitch) 72 (FIG. 8). The detection switch 72 is attached to the pivotal bracket 91 of the supporting means 33. With the detection switch 72 received in the receiving space 71, the lower portion 55 of the holder body 32 is attached to the pivotal bracket 91 of the supporting means 33.

When the mobile terminal 28 is inserted into the holder body 32, the lower portion 28a of the mobile terminal 28 depresses an operational lever 72a to switch the detection switch 72 on, thereby detecting insertion of the lower portion 28a of the mobile terminal 28 into the holder body 32. As a result of the insertion of the lower portion 28a of the mobile terminal 28 into the holder body 32, the mobile terminal 28 can be switched to be capable of displaying the information as provided by the information display portion 26 of the vehicle 10.

The mobile terminal 28 is detachably attached to the holder body 32, and has a rectangular shape. The mobile terminal 28 is, for example, a well-known one (it is called a tablet terminal). The mobile terminal 28 includes a surface 28b including a rectangle-shaped terminal display screen (a display screen) 74 and a non-displaying surface 75 surrounding the terminal display screen 74. The terminal display screen 74 displays information provided by communication function of the mobile terminal 28 or the information as provided by the information display portion 26 of the vehicle 10. The terminal display screen 74 has an outer circumference 74a alongside which the non-displaying surface 75 extends.

The holder unit 27 (the holder body 32) is disposed rearwardly of the housing 12 in opposed relationship with the information display portion 26, such that the terminal display screen 74 of the mobile terminal 28 retained in the holder body 32 is aligned with the display screen 26a of the information display portion 26 to bring the display screen 26a out of the driver's sight, so as to allow the driver to comfortably view information displayed on the mobile terminal 28 inserted into the holder body 32, as in the case of information displayed on the display screen 26a of the information display portion 26.

When the lower portion 28a of the mobile terminal 28 is inserted into the holder body 32, the non-displaying surface 75 is disposed along a back side of the holder body 32 (the rear wall 52), preventing the holder body 32 from covering the terminal display screen 74 of the mobile terminal 28. As a result, information displayed on the terminal display screen 74 of the mobile terminal 28 can be appropriately viewed.

Figure 6:
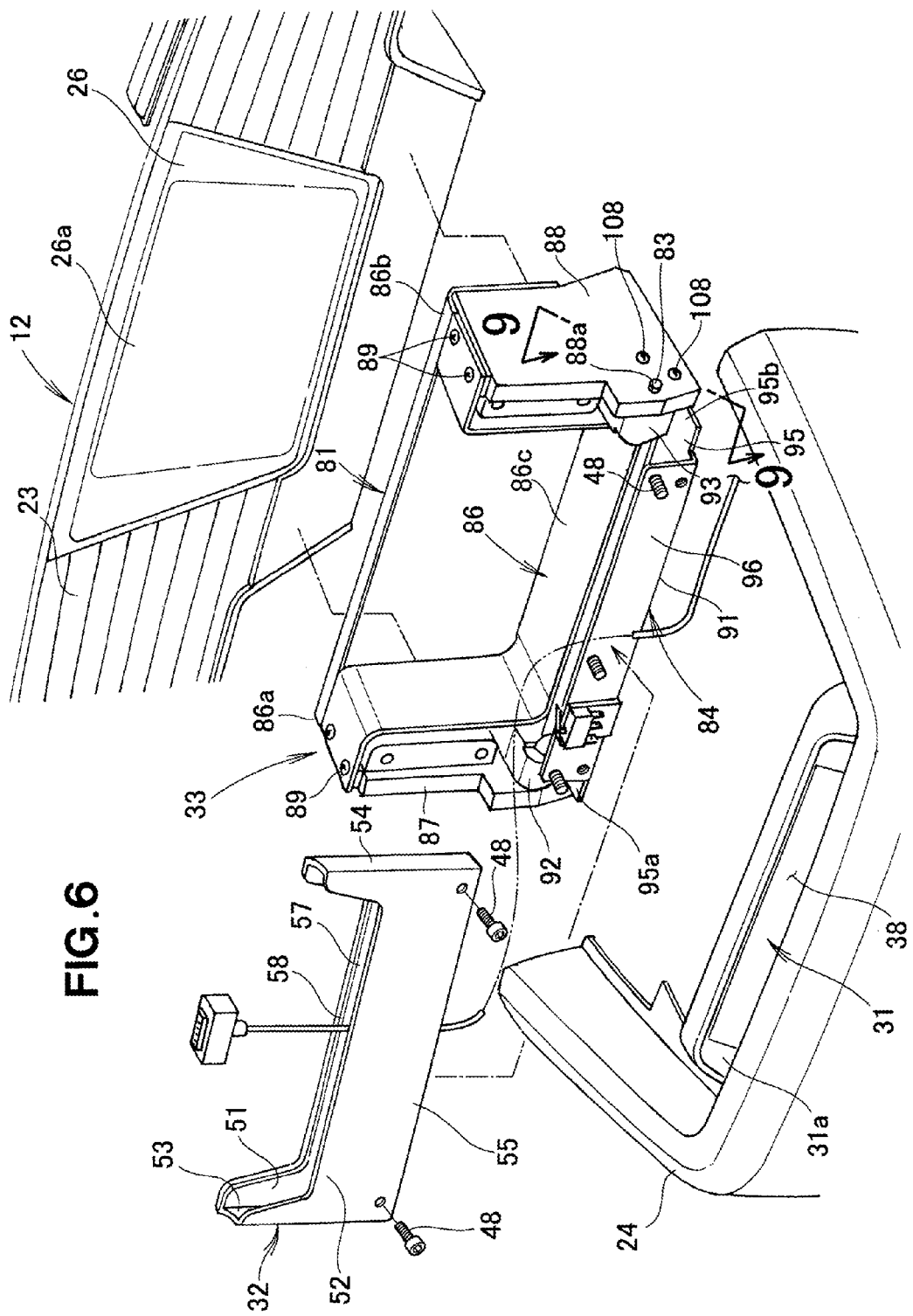
FIG. 6 is an exploded perspective view of the holder unit in the first embodiment.
Figure 7:
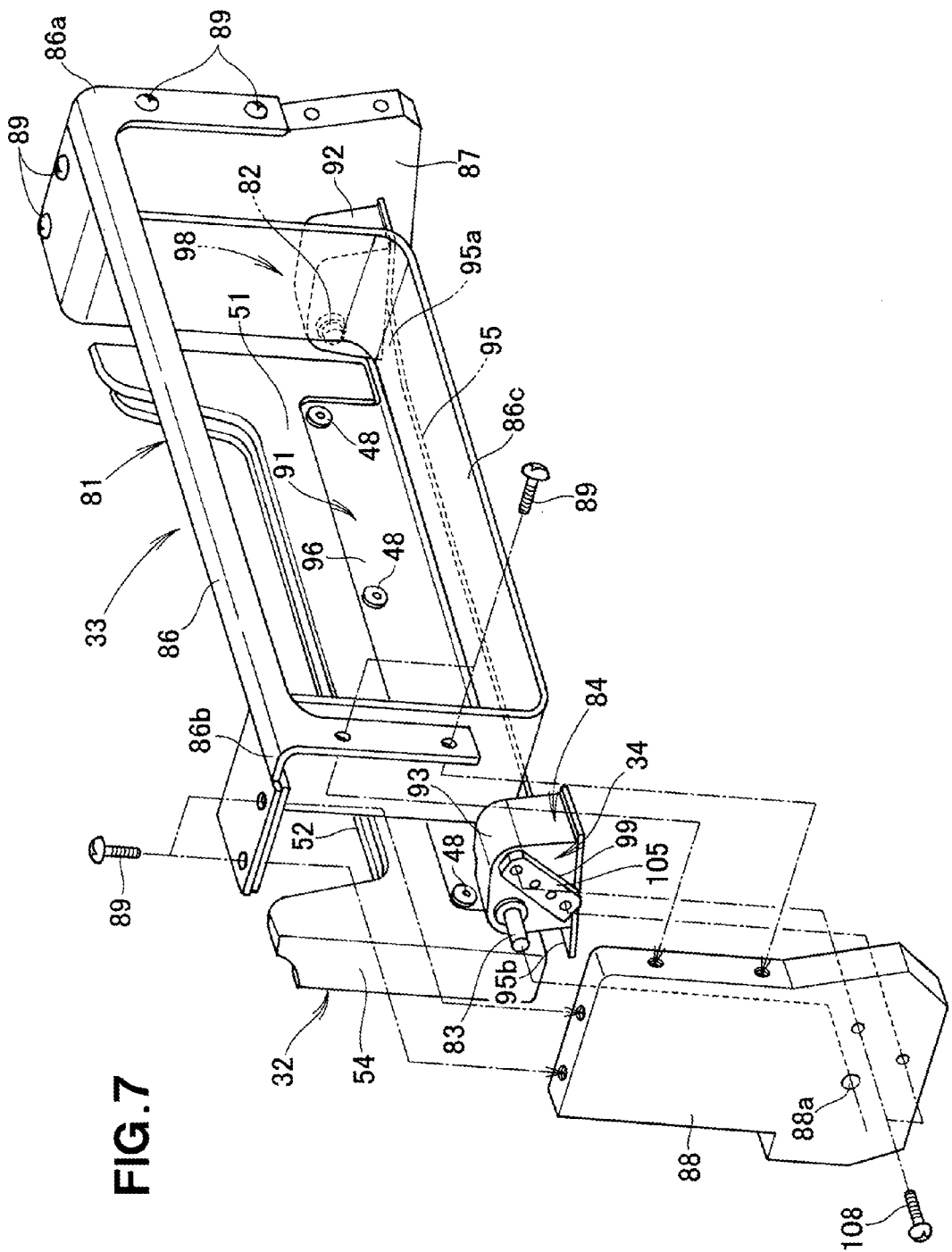
FIG. 7 is an exploded perspective view of the holder unit in the first embodiment as the holder unit is viewed from a front side of the vehicle.

As shown in FIG. 6 and FIG. 7, the holder body 32 is supported by the supporting means 33. The supporting means 33 includes a support member 81 secured to the housing 12, left and right support shafts 82, 83 disposed leftwardly and rightwardly of the support member 81, respectively, and a pivotal portion 84 supported by the left and right support shafts 82, 83.

The support member 81 includes a support bracket 86 and left and right attachment portions 87, 88 secured to left and right side parts 86a, 86b of the support bracket 86 by means of plurality of bolts 89. The left and right attachment portions 87, 88 are secured to the housing 12 by means of plurality of bolts (not shown). The left and right attachment portions 87, 88 have left and right support holes (only right one 88a shown) formed therethrough. The left support shaft 82 is rotatably supported in the left support hole, and the right support shaft 83 is rotatably supported in the right support hole 88a.

The pivotal portion 84 is disposed on the left and right support shafts 82, 83. The pivotal portion 84 includes a pivotal bracket 91 disposed rearwardly of the support member 81, and left and right pivotal blocks 92, 93 disposed leftwardly and rightwardly of the pivotal bracket 91. The pivotal bracket 91 includes a horizontal portion 95 disposed below the support bracket 86 (a bottom 86c) and a vertical portion 96 bent upwardly from a rear edge of the horizontal portion 95.

The left and right pivotal blocks 92, 93 are carried on left and right ends 95a, 95b of the horizontal portion 95, respectively. The lower portion 55 of the holder body 32 is attached (secured) to a rear surface of the vertical portion 96 by means of the plurality of bolts 48.

The left support shaft 82 protrudes from the left pivotal block 92 laterally outwardly of the vehicle. The left support shaft 82 is rotatably supported in the left support hole. Similarly, the right support shaft 83 protrudes from the right pivotal block 93 laterally outwardly of the vehicle. The right support shaft 83 is rotatably supported in the right support hole 88a.

In short, the holder body 32 is pivotably attached to the support member 81 through the left and right support shafts 82, 83, such that the holder body 32 is supported to pivot on the left and right support shafts 82, 83 in a front-and-rear direction of the vehicle between the detachable position P1 (FIG. 2) and the displaying position P2 (FIG. 3).

As shown in FIG. 8, when in the detachable position P1, the holder body 32 is inclined toward the driver's seat 18 (FIG. 1) to allow the mobile terminal 28 (FIG. 2) to be attached to and detached from the holder body 32. When in the displaying position P2, the holder body 32 is inclined toward the housing 12 to display information on the mobile terminal 28, as shown in FIG. 3.

By inclining the holder body 32 toward the driver's seat 18, i.e., positioning the holder body 32 in the detachable position P1, the driver can easily attach the mobile terminal 28 to and detach the same from the holder body 32. By inclining the holder body 32 toward the housing 12, i.e., positioning the holder body 32 in the displaying position P2, the driver can view information on the mobile terminal 28, assuming the comfortable position.

Figure 9:
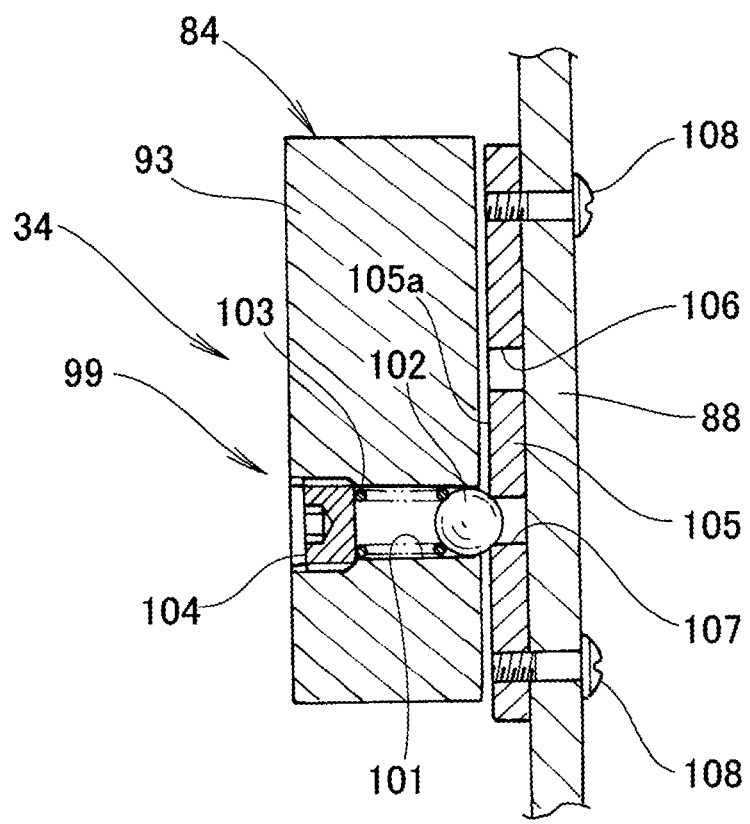
FIG. 9 is a cross-sectional view taken along line 9-9 of FIG. 6.

As shown in FIG. 7 and FIG. 9, the locking means 34 includes a left locking portion 98 disposed on the left pivotal block 92, and a right locking portion 99 disposed on the right pivotal block 93. The left and right locking portions 98, 99 bear a symmetrical relationship to each other, and hence description of the left locking portion 98 is omitted.

The right locking portion 99 includes a ball 102 received in a receiving hole 101 formed through the right pivotal block 93, a locking plate 105 retaining the ball 102 in the receiving hole 101, a compression spring 103 pressing the ball 102 toward a locking plate 105, and a retaining screw 104 retained in the receiving hole 101. The locking plate 105 is attached to the right attachment portion 88 by means of bolts 108.

The locking plate 105 has "detachable" and "displaying" holes 106, 107 for locking the ball 102 therein. By the "detachable" hole 106 locking the ball 102 therein, the pivotal portion 84 (i.e., the holder body 32) is held in the detachable position P1 (FIG. 2). By the "displaying" hole 107 locking the ball 102 therein, the pivotal portion 84 (i.e., the holder body 32) is held in the displaying position P2 (FIG. 3).

When the pivotal portion 84 moves between the detachable position P1 and the displaying position P2, the ball 102 is forced by an interior surface 105a of the locking plate 105 into the receiving hole 101 and then moves along the interior surface 105a. That is, the movement of the ball 102 along the interior surface 105a of the locking plate 105 allows the pivotal portion 84 to move (pivot) between the detachable position P1 and the displaying position P2.

When the pivotal portion 84 reaches the detachable position P1 or the displaying position P2, the ball 102 is locked in the "detachable" hole 106 or the "displaying" hole 107 under a force of the compression spring 103. In short, the locking means 34 holds the holder body 32 in the detachable position P1 or the displaying position P2.

As shown in FIG. 4 and FIG. 8, the retaining means 35 retains the mobile terminal 28 (FIG. 3) in the holder body 32. The retaining means 35 is disposed within the inner space 57. More specifically, the retaining means 35 is disposed on an inner surface 51a of the front wall 51 facing the inner space 57. The retaining means 35 includes a left elastic member (an elastic member) 111 disposed on a left end portion 51b of the inner surface 51a, and a right elastic member 112 disposed on a right end portion (not shown) of the inner surface 51a.

The left elastic member 111 is disposed on the left end portion 51b of the inner surface 51a such that the left elastic member 111 is interposed between the left end portion 51b of the inner surface 51a and a left lower portion 28c of the mobile terminal 28. Similarly, the right elastic member 112 is disposed on the right end portion of the inner surface 51a such that the right elastic member 112 is interposed between the right end portion of the inner surface 51a and a right lower back surface 28d of the mobile terminal 28.

The left and right elastic members 111, 112 disposed on the left and right end portions of the inner surface 51a adapt the inner space 57 of the holder body 32 to a thickness T (FIG. 2) of the mobile terminal 28. That is, the left and right elastic members 111, 112 fill a gap between a width of the inner space 57 of the holder body 32 and a thickness of the mobile terminal 28 so as to prevent a backlash between the holder body 32 and the mobile terminal 28 inserted into the holder body 32. As a result, the mobile terminal 28 can be stably retained in the inner space 57 of the holder body 32.

A discussion is made below with reference to FIG. 10A and FIG. 10B as to when the mobile terminal 28 is inserted into the holder body 32 in the detachable position P1 and subsequently the holder body 32 is placed in the displaying position P2 with the mobile terminal 28 inserted into the holder body 32.

Figure 10:
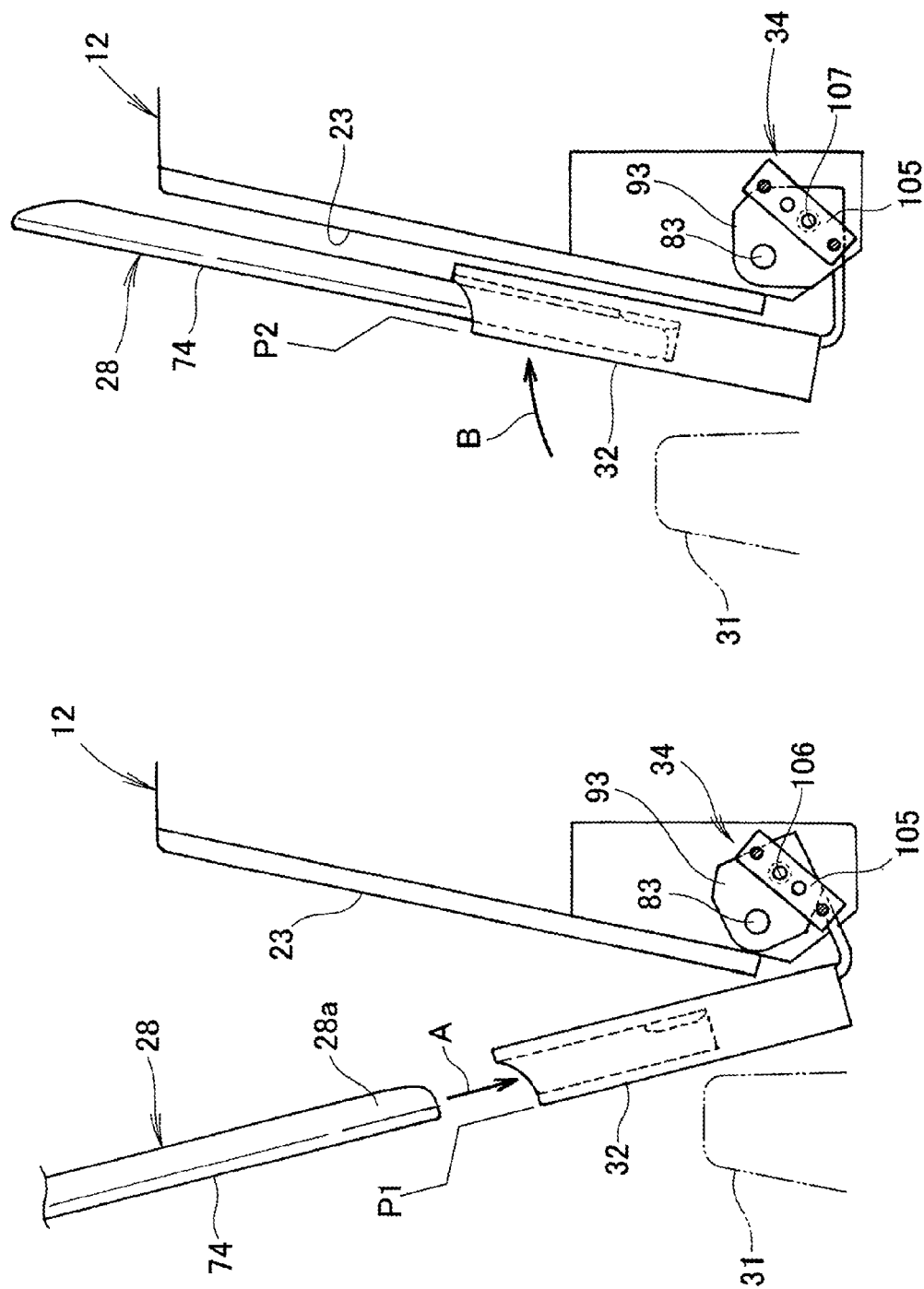
FIG. 10A is a view showing that the mobile terminal is inserted into the holder body in the first embodiment as the holder body is in a detachable position.
FIG. 10B is a view showing that the holder body with the mobile terminal inserted thereinto in the first embodiment is in a displaying position.

As shown in FIG. 10A, when placed in the detachable position P1, the holder body 32 is held in the detachable position P1 by the locking means 34, such that the driver seated on the driver's seat 18 (FIG. 1) can easily insert the lower portion 28a of the mobile terminal 28 into the holder body 32, as indicated by an arrow A. As a result, the mobile terminal 28 is retained by the holder body 32.

As shown in FIG. 10B, the holder body 32 retaining the mobile terminal 28 pivots toward the housing 12, as indicated by an arrow B, to be placed in the displaying position P2, such that the holder body 32 is held in the displaying position P1 by the locking means 34. The holder body 32 can remain in the displaying position P2, for example, as the vehicle 10 (FIG. 1) runs. As a result, the driver seated on the driver's seat 18 (FIG. 1) can view the terminal display screen 74 in the comfortable position.

As shown in FIG. 10A, also, when the holder body 32 is held in the detachable position P1, the driver seated on the driver's seat 18 (FIG. 1) can easily release or take out the mobile terminal 28 from the holder body 32. Since the driver seated on the driver's seat 18 can easily attach the mobile terminal 28 to and detach the same from the holder body 32, the usability is enhanced.

Two modifications to the first embodiment are discussed with reference to FIG. 11 and FIG. 12. In the first modification, a holder body 120 is provided. In the second modification, a vehicular display device 126 is provided. It is noted that the holder body 120 and the vehicular display device 126 include parts discussed above in the first embodiment and descriptions of these parts are omitted.

Figure 11:
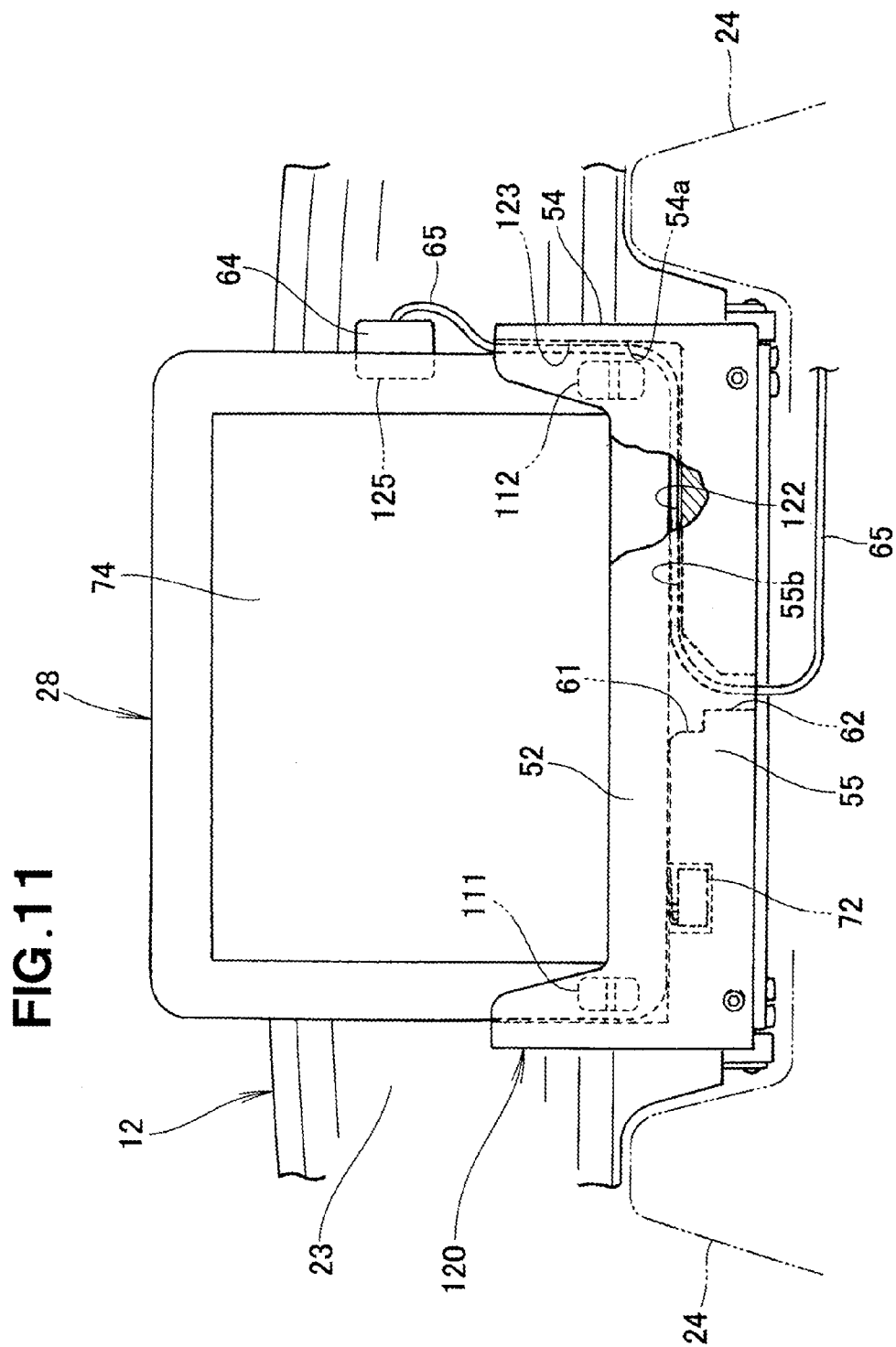
FIG. 11 is a front elevation view showing a first modification to the first embodiment.

As shown in FIG. 11, the holder body 120 includes a bottom channel 122 formed on the lower portion 55, and a right channel 123 formed on the right sidewall 54. The other parts of the holder body 32 are substantially identical to those of the holder body 32 in the first embodiment.

The bottom channel 122 is formed on a surface 55b defining a bottom of the inner space 57. The right channel 123 is formed on a surface 54a defining a right side of the right sidewall 54. The bottom channel 122 and the right channel 123 are shaped to receive the harness 65, such that the harness 65 inserted through the harness insertion hole 62 and the retaining recess 61 can be pulled out of the holder body 120 through the bottom channel 122 and the right channel 123, such that the charging connector 64 can be easily connected to a connection portion 125 located on a right side of the mobile terminal 28 inserted into the holder body 120. As is clear from the foregoing, the holder body 120 can be adapted to various types of mobile terminals 28 to enhance the usability.

Figure 12:
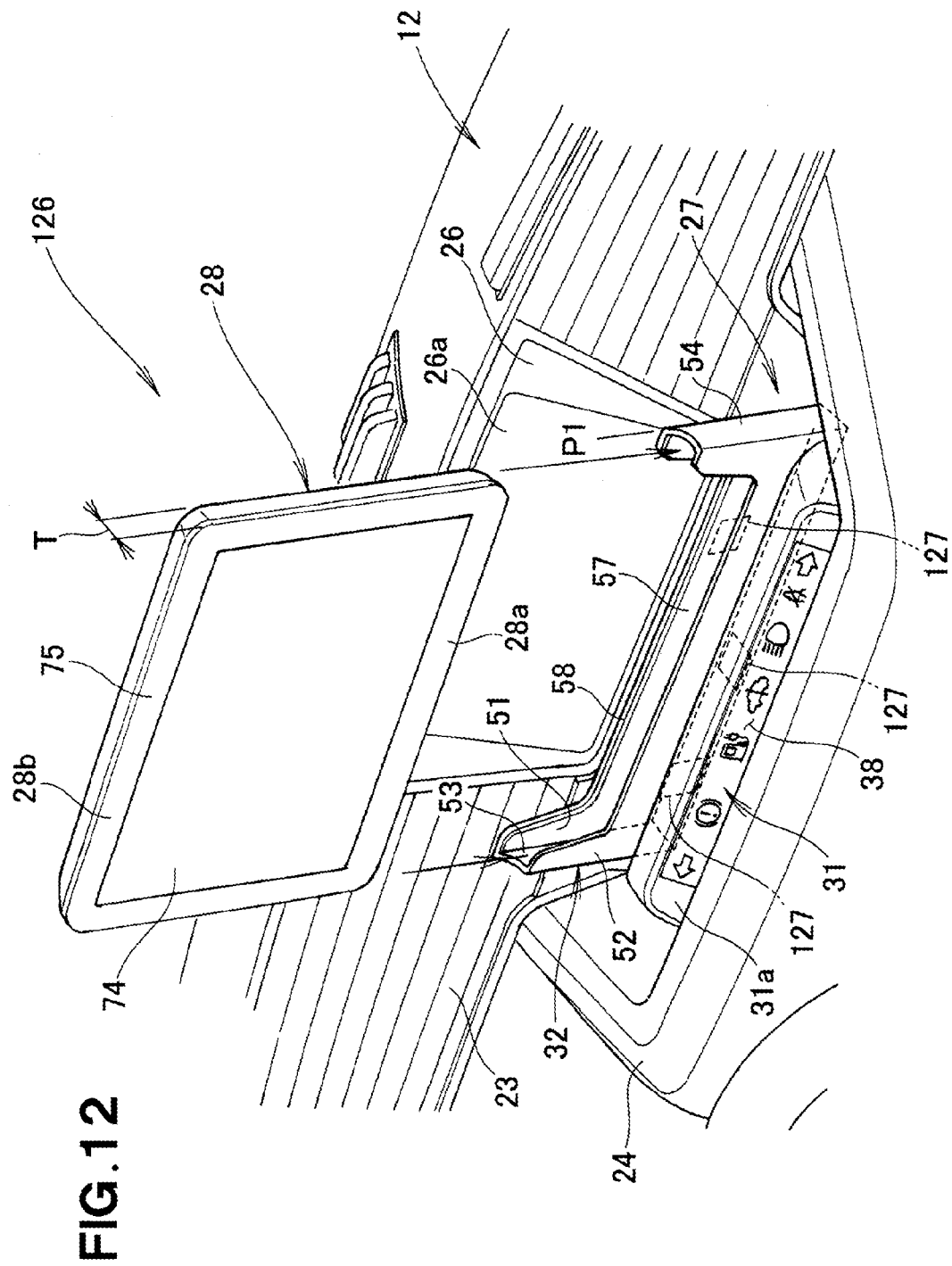
FIG. 12 is a perspective view showing a second modification to the second embodiment.

As shown in FIG. 12, the vehicular display device 126 includes a non-contact connector 127 in place of the charging connector 64. The other parts of the display device 126 are substantially identical to those in the vehicular display device 16 in the first embodiment.

The non-contact connector 127 is a typical charging unit (a primary coil) for charging the mobile terminal in a non-contact manner. The non-contact connector 127 can be incorporated into any locations of the holder body 32 or the warning display portion 31, such as a bottom or lateral (back) side of the holder body 32 or a back side of the warning display portion 31.

The mobile terminal 28 has a secondary coil incorporated into a location thereof corresponding to the non-contact connector 127. The secondary coil is a typical coil for use with the non-contact charging unit. The mobile terminal 28 can be charged without contacting the connector 127 just by insertion of the lower portion 28a of the mobile terminal 28 into the holder body 32. Since it is possible to charge the mobile terminal 28 without taking a lot of time and effort, the usability of the vehicular display device 126 can be enhanced.

A vehicular display device 130 in a second embodiment of the present invention is discussed with reference to FIG. 13. It is noted that the vehicular display device 130 includes parts discussed in the first embodiment and descriptions of these parts are omitted.

Figure 13:
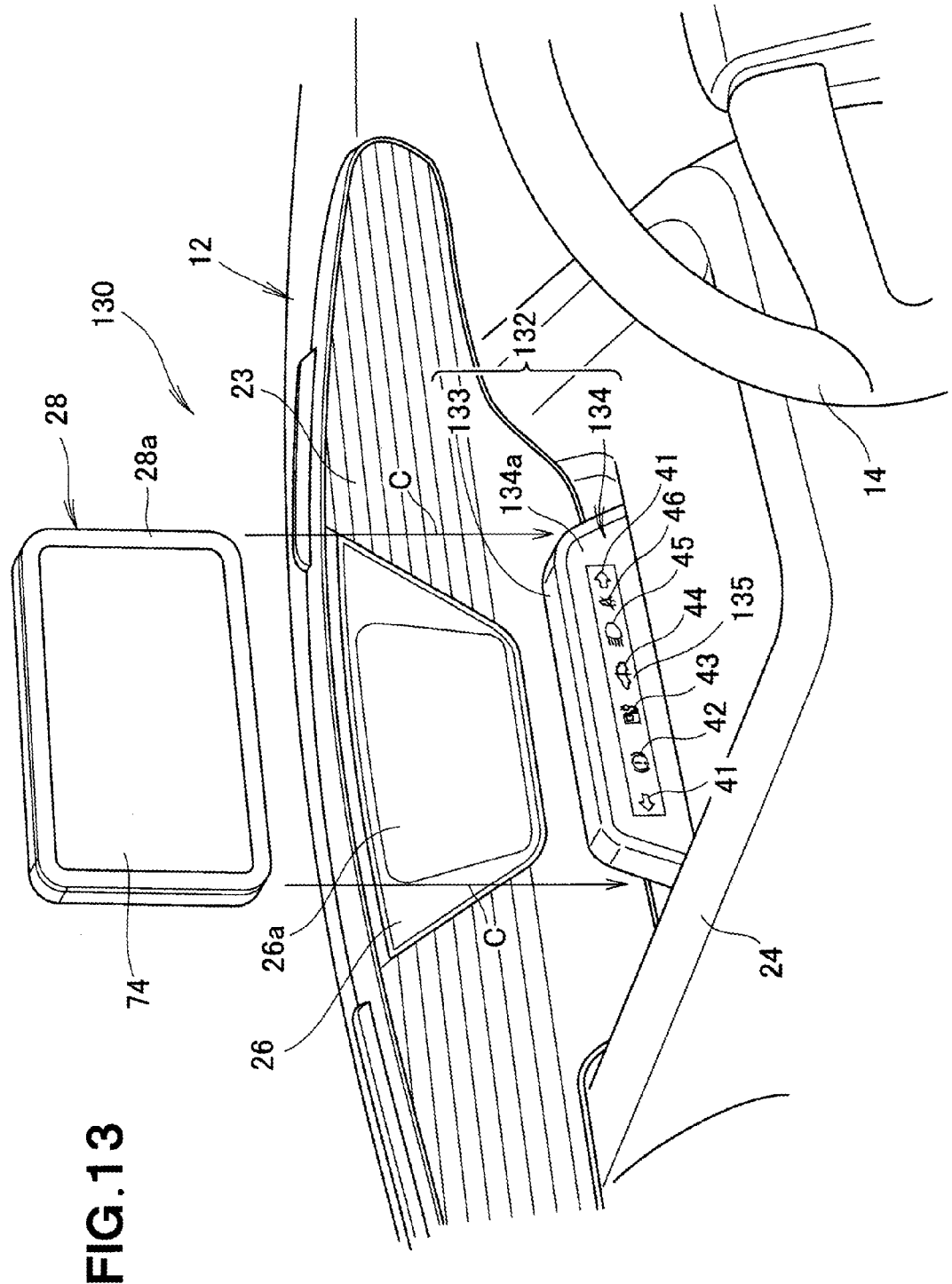
FIG. 13 is a perspective view of a vehicle including a display device in a second embodiment of the present invention.

As shown in FIG. 13, the vehicular display device 130 includes a holder unit 132 in place of the holder unit 32. The other parts of the display device 130 are substantially identical to those in the vehicular display device 16.

The holder unit 132 is disposed rearwardly of the housing 12 (display wall 23) in opposed relationship with the information display portion 26. The holder unit 132 includes a holder body 133 formed integrally with the holder receiving portion 24 of the housing 12, and a warning display portion 134 formed integrally with a front surface of the holder body 133 located in opposed relationship with the driver's seat 18 (FIG. 1).

The holder body 133 is disposed rearwardly of the display wall 23 in opposed relationship with the information display portion 26. The mobile terminal 28 is inserted between the holder body 133 and the display wall 23, as indicated by an arrow C, such that the lower portion 28a of the mobile terminal 28 is sandwiched between these parts 133, 23. In other words, the mobile terminal 28 is detachably retained between the holder unit 132 (more specifically, the holder body 133) and the display wall 23, as in the case of the first embodiment.

The warning display portion 134 has a warning display screen 135 on a front surface 134a thereof located in opposed relationship with the driver's seat 18 (FIG. 1), as in the warning display portion 31. The warning display screen 135 has the indicators and lights 41 to 46. The indicators and lights 41 to 46 of the warning display screen 135 can be turned on, when necessary, to indicate to the driver the corresponding different statuses of the vehicle 10, as is discussed in the first embodiment.

As for the holder unit 132 in the second embodiment, the holder body 133 is formed integrally with the holder receiving portion 24 of the housing 12 and the warning display portion 134 is formed integrally with the holder body 133, and hence the holder unit 132 has a compact (small-sized) and simple structure.

Next, a modification to the second embodiment is discussed with reference to FIG. 14. It is noted that a vehicular display device 140 in the second embodiment includes parts discussed in the second embodiment, and descriptions of these parts are omitted.

Figure 14:
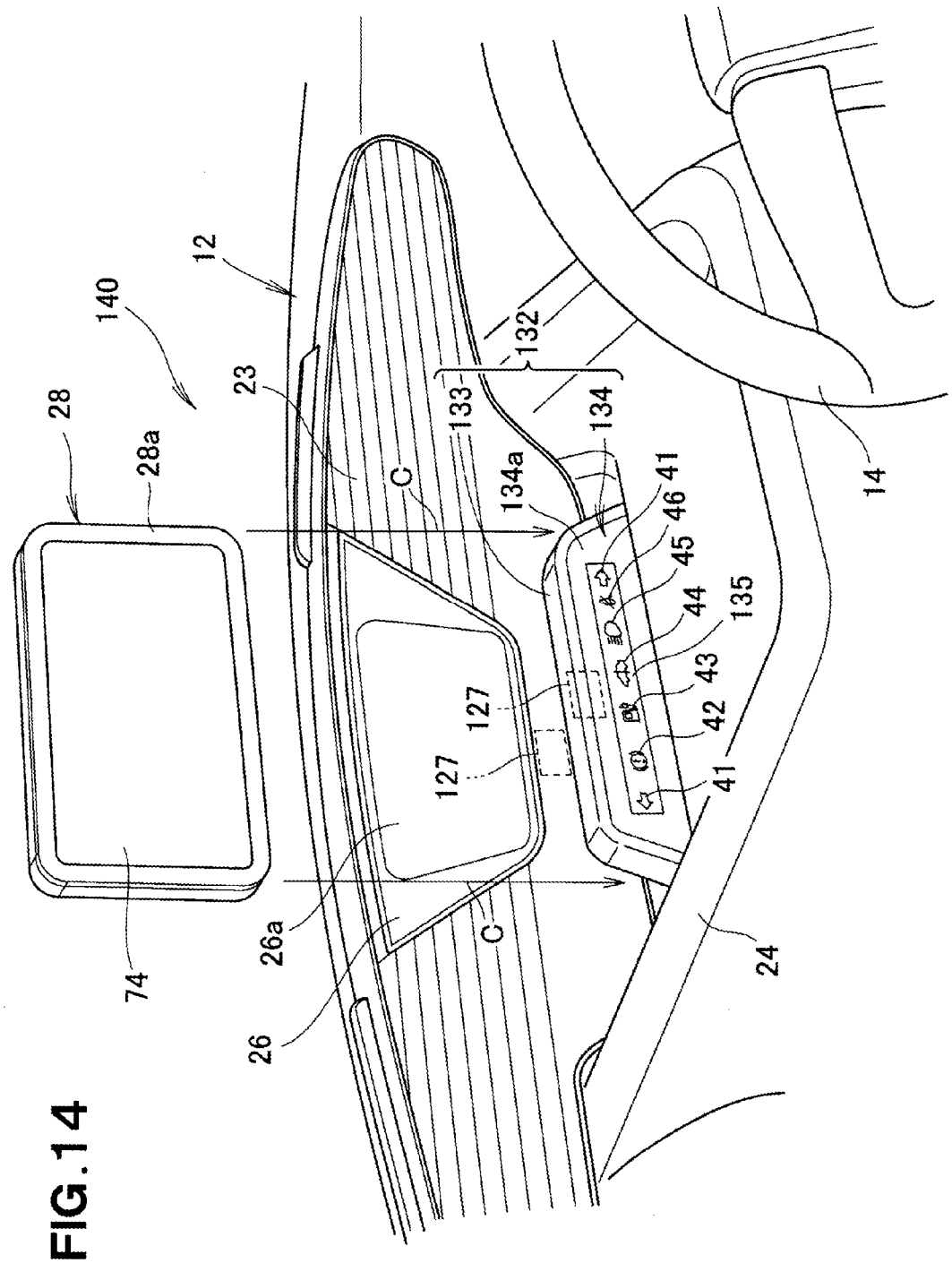
FIG. 14 is a perspective view showing a modification to the second embodiment.

As shown in FIG. 14, the vehicular display device 140 includes a non-contact connector 127 in place of the charging connector 64 (FIG. 5). The other parts of the display device 140 are substantially identical to those in the vehicular display device 130 in the second embodiment.

The non-contact connector 127 is a typical non-contact charging unit (a primary coil), as in the second modification to the first embodiment. The non-contact connector 127 can be incorporated into the display wall 23 of the housing 12 or any locations of the holder unit 132, such as a back side of the holder unit 132 (more specifically, the holder body 133).

The mobile terminal 28 has a secondary coil incorporated into a location thereof corresponding to the non-contact connector 127, as in the second modification to the first embodiment. The mobile terminal 28 can be charged without contacting the connector 127 just by insertion of the mobile terminal 28 between the holder body 133 and the display wall 23. Since it is possible to charge the mobile terminal 28 without taking a lot of time and effort, the usability of the vehicular display device 140 can be enhanced.

It should be noted that the vehicular display device is not limited to that discussed in the embodiments and modifications but may be appropriately modified and improved. For example, the holder body 32 is not limited to one manually pivoted on the left and right support shafts 82, 83 in the front-and-rear direction of the vehicle, but may be pivoted by an electric motor or actuator. In addition, the locking means 34 is not limited to structures of the locking portions 98, 99, but may employ other structures.

It should be noted that the vehicle, the housing, the vehicular display device, the driver's seat, the information display portion, the holder unit, the mobile terminal, the warning display portion, the holder body, the retaining recess, the harness insertion hole, the charging connector, the harness, the terminal display screen, the non-displaying surface and the left and right elastic members are not limited in shape and structure to those discussed above, but may be appropriately modified.

It should be noted that the non-contact connector 127 may be either stationary or movable, in response to detection of a location of the secondary coil, to a location corresponding to the location of the secondary coil.

The present invention is preferably applicable to an automobile having a display device including an information display portion disposed forwardly of the driver's seat and having a display screen for displaying information such as an automobile velocity.

Obviously, various minor changes and modifications of the present invention are possible in the light of the above teaching. It is therefore to be understood that within the scope of the appended claims the invention may be practiced otherwise than as specifically described.

What is claimed is:

1. A vehicular display device having an information display portion disposed on a housing provided forwardly of a driver's seat of a vehicle, the information display portion having a display screen located in opposed relationship with the driver's seat and configured to display information on the display screen, the vehicular display device comprising:
   a holder unit disposed rearwardly of the housing in opposed relationship with the information display portion; and
   a mobile terminal detachably retained between the holder unit and the housing,
   wherein the holder unit includes a warning display portion that displays statuses of different parts of the vehicle independently from contents displayed on the mobile terminal and the information display portion, and a holder body disposed between the warning display portion and the housing, separately from the warning display portion,
   wherein the warning display portion is located between the mobile terminal retained by the holder unit and the driver's seat and disposed on a front surface of the holder unit located in opposed relationship with the driver's seat, and
   wherein the holder body includes a recess formed on a bottom of the holder body for retaining a charging connector connectable to the mobile terminal, a bottom channel formed in the bottom of the holder body and a side channel for receiving therein a harness of the charging connector, and an insertion hole communicating with the recess for allowing insertion of the harness of the charging connector through the insertion hole.

2. The vehicular display device of claim 1, wherein the holder body includes a supporting means for pivotably supporting the holder body such that the holder body pivots in a front-and-rear direction of the vehicle between a detachable position located on a side of the driver's seat for allowing the mobile terminal to be attached to and detached from the holder body and a displaying position located on a side of the housing for displaying information on the mobile terminal, and a locking means for locking the holder body in two or more positions in which the holder body inclines at a different angle of inclination in the front-rear direction of the vehicle.

3. The vehicular display device of claim 1, wherein the holder body is a frame formed to allow a lower part of the mobile terminal to be inserted from above into the frame, the holder body having a front wall and a rear wall located rearward of the front wall, and an inner space defined between the front wall and the rear wall,
   wherein the holder unit further includes an elastic member disposed on an inner surface of the front wall facing the inner space of the holder body, the elastic member being interposed between the holder body and the mobile terminal and elastically retaining the mobile terminal in the holder body, and
   wherein the mobile terminal includes a display screen for displaying information thereon, and a non-displaying surface surrounding the display screen, the non-displaying surface being disposed along the frame when the lower part of the mobile terminal is being inserted in the frame.

4. The vehicular display device of claim 1, further comprising a non-contact charging unit incorporated in one of the holder unit and the housing for charging the mobile terminal without contacting the mobile terminal.

* * * * *